Aug. 25, 1959 A. ORNER 2,901,247

CARD PROCESSING APPARATUS

Filed Sept. 23, 1957 4 Sheets-Sheet 1

INVENTOR
Allan Orner
By Smyth & Roston
Attorneys

Aug. 25, 1959 A. ORNER 2,901,247

CARD PROCESSING APPARATUS

Filed Sept. 23, 1957 4 Sheets-Sheet 2

INVENTOR:
Allan Orner
By Smyth & Roston
Attorneys

INVENTOR:
Allan Orner
By Smyth & Roston
Attorneys.

INVENTOR:
Allan Orner

By Smyth & Roston

Attorneys.

United States Patent Office 2,901,247
Patented Aug. 25, 1959

2,901,247

CARD PROCESSING APPARATUS

Allan Orner, Los Angeles, Calif., assignor to The Magnavox Company, Los Angeles, Calif., a corporation of Delaware Application September 23, 1957, Serial No. 685,539

23 Claims. (Cl. 271—5)

This invention relates to data processing apparatus for handling a plurality of information storage cards having signal representations recorded on them. The invention relates more particularly to an improved card holding station in such apparatus. The invention is especially concerned with an improved card holding station which cooperates with other components of the apparatus and which functions to hold the cards in a stacked condition to be controllably fed to a transporting portion of the apparatus or received from such portion.

In the field of data processing, binary digital codes and other types have been used in conjunction with suitable recording media to store a wide range of information for future use. In one type of data processing system, the information is stored on a plurality of separate cards. Each card is provided with a plurality of positions for storing individual bits of information on one or both of its sides. This information may be stored in the form of magnetic dots of one polarity or another, in the form of hole patterns in the cards, in the form of photograph representations or in any other appropriate form.

A large number of such information storage cards are often required in complex data processing systems since millions of bits of information are required to represent the data to be stored in such systems. Problems have arisen, therefore, in providing a convenient means for storing the cards themselves and in enabling the cards to be quickly and conveniently fed to apparatus appropriate for processing them.

In one type of prior art system, a group of storage cards to be fed into the system has been maintained in stacked relationship in a card holding station. The cards in the holding station have been controllably fed in succession from the station to an appropriate transporting means for the cards. They have been then carried by the transporting means past a transducer station for processing purposes. Upon the completion of the processing operation, the cards have been returned either to the same or to different stations to be restacked in such stations.

Copending application Ser. No. 538,111 filed October 3, 1955, now Patent No. 2,842,362 of July 8, 1958 in the name of Robert M. Hayes discloses an improved apparatus which is capable of two modes of operation. In one operational mode, the cards may be controllably transferred out of the holding station to the transporting means. In a second operational mode, the cards are stripped from the transporting means and deposited in the station.

The apparatus of the copending application simplifies many data processing systems to a large extent and increases the flexibility in the operational functions of the system. For example, the apparatus of the copending application permits cards to be fed from a particular station to the transporting means for subsequent processing and then to be returned automatically to the same station after the processing has been completed. This apparatus also permits a convenient interchange of cards between two or more stations for sorting or collating purposes.

The reversible feeding-stacking stations and apparatus described in the copending application referred to above utilize mechanical linkages and members to accomplish this desired dual function. Copending application Ser. No. 645,639, filed March 12, 1957, in the name of Alfred Nelson et al., also discloses a reversible feeding-stacking station which also accomplishes the purpose of the first application. However, the dual purpose feeding-stacking station of the latter application uses vacuum pressure principles rather than mechanical linkages to achieve the desired end. This enables certain simplifications to be realized in the construction and design of the reversible apparatus as fully described in copending application Ser. No. 645,639.

A certain problem may be sometimes encountered in the reversible stations described in the copending applications and may also occur in other types of card holding stations in data processing systems. This problem is concerned with providing a convenient means for inserting a stack of cards into an input station of the system so that the cards in the stack may be successively processed. There is also the problem of providing a convenient means for holding and storing the cards when they are not actually in the input station of the processing system.

The large number of cards usually involved in data processing systems requires that the cards be stored in a storage area separate from the processing apparatus itself. Then, when any group of cards is to be processed, the stack containing that group is removed from the storage area and placed in the input station of the system for successive feeding into the system.

The present invention provides that different groups of the cards be held in individual magazines, with each magazine holding a group of cards in a stacked relation. The magazine then can be stored in the storage area when not in use, and whenever a desired card or group of cards is to be processed, the magazine containing this card or group may be removed from the storage area and inserted into the input station of the processing apparatus. The invention provides a construction for the data processing apparatus which permits a selected magazine of cards to be quickly snapped into place to allow the cards to be successively fed into the system for data processing.

The apparatus of the invention may be used in conjunction with a simple card holding station in which the magazine is inserted so that the cards may be fed in a one-by-one sequence to the transporting means. Also, the apparatus may be used in conjunction with the reversible stations described above and disclosed in the copending applications referred to above.

When used with a reversible type of station, the invention provides that a magazine of cards may be inserted or withdrawn from the station without interfering in any manner with the card transfer control components of the station. When the magazine is in place, the station may be controlled so that cards can be fed in a controlled manner from the magazine to the transporting means. Alternately, the station may be controlled so that cards can be stripped from the transporting means and deposited in the magazine.

Figure 1:
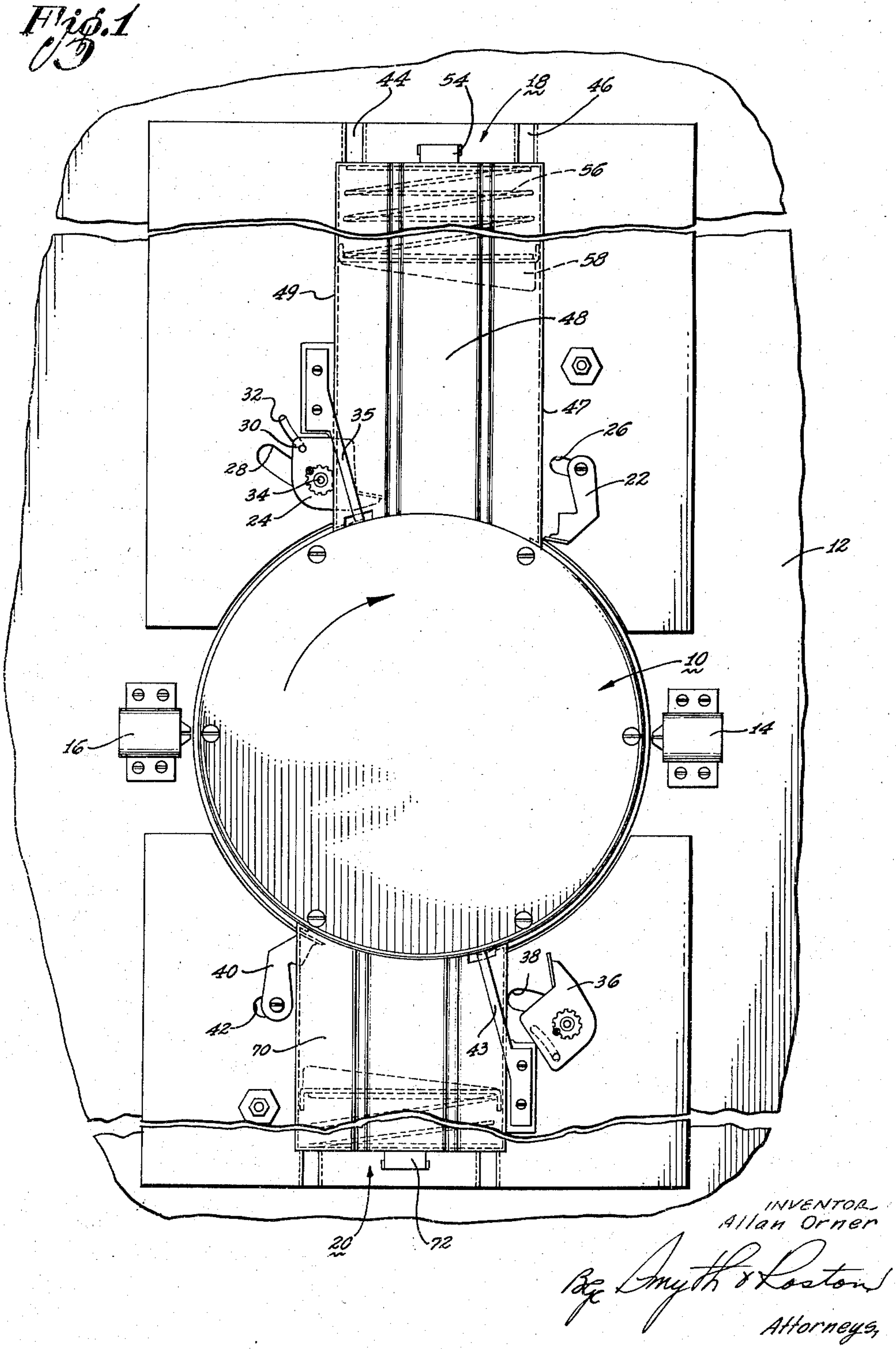
Figure 1 is a top plan view showing simplified data processing apparatus which comprises a pair of stations contiguous to a transporting drum, the stations of the illustrated apparatus being adapted to utilize magazines for the cards in accordance with the concepts of the present invention.

The data processing apparatus and system of Figure 1 is shown as including transport means such as a vacuum transporting drum 10. This drum is constructed in a manner to be described, and it transports the cards on its peripheral surface by means of a vacuum pressure which is established at that surface. The drum 10 is rotatably mounted for clockwise rotation on a table top 12.

A first transducing means 14 is mounted on the table top 12 and is positioned to be contiguous to the periphery of the drum 10. A second transducing means 16 may also be mounted on the table top 12. This second transducing means is positioned on the opposite side of the drum 10 from the transducing means 14, and the transducing means 16 is also positioned to be contiguous to the periphery of the drum. Each of the transducing means 14 and 16 may, for example, comprise a series of usual and known electro-magnetic transducer heads. Each of these heads is adapted to sense and process a different row of data on each of the cards transported on the periphery of the drum 10.

A first reversible station indicated generally as 18 is positioned on the table top 12 at one side of the drum 10 between the transducing means 14 and 16. Likewise, a second reversible station 20 is positioned on the table top on the opposite side of the drum 10 from the station 18.

The station 18 includes a stack head 22, and it includes a feed head 24. These heads may be constructed and controlled in a manner fully described in the copending application Ser. No. 645,639 referred to previously. Briefly, the stack head 22 is movable in a slot 26 from a standby position to the right in Figure 1 to an operative position in which its end is contiguous to the periphery of the drum 10. In its operative position, the stack head engages cards transported on the drum and causes them to be removed from the peripheral surface in the drum and to be deposited in the station.

The feed head 24 is movable in a slot 28 from a standby position to the left in Figure 1 to an operative position in which it controls the feed of cards to the peripheral surface of the drum. This control is made through a vacuum pressure which the feed head exerts on the cards in the station, as will be described. The feed head 24 also includes a depending pin 30 which extends into a slot 32. This pin causes the head 24 to pivot about its axis 34 when it is withdrawn to its standby position. Such pivoting action of the feed head closes an internal mechanical valve to shut off the vacuum pressure to the surface of the feed head when the head is not in use. The station also includes a lifter assembly 35 for lifting cards from the periphery of the drum 10 so as to facilitate the stacking of the cards in proper sequence in the station 18.

The above-described operation of the feed head is fully described in the copending application Ser. No. 645,639. The copending application also fully describes the manner in which the feed head 24 and the stack head 22 may be moved between their standby and operative positions. Because the actual control and operation of the feed head and the stack head form no parts of the present invention, it is believed unnecessary to dwell in detail upon the manner in which these heads are controlled. It is believed sufficient at this point to state that the heads may conveniently be controlled by mounting them on appropriate levers and by providing a cam control for the levers. Such a control is described in the copending application, and it provides for one of the heads to be moved to its operative position as the other is moved to a standby position, and vice versa.

The station 20 may also includes a feed head 36 which is movable in a slot 38, and the latter station may includ a stack head 40 which is movable in a slot 42. The latter stack head and feed head may be identical to the corresponding elements described in conjunction with the station 18, and these latter heads may be controlled and operated in the same manner. The station 20 also includes a lifter assembly 43.

Figures 3, 4:
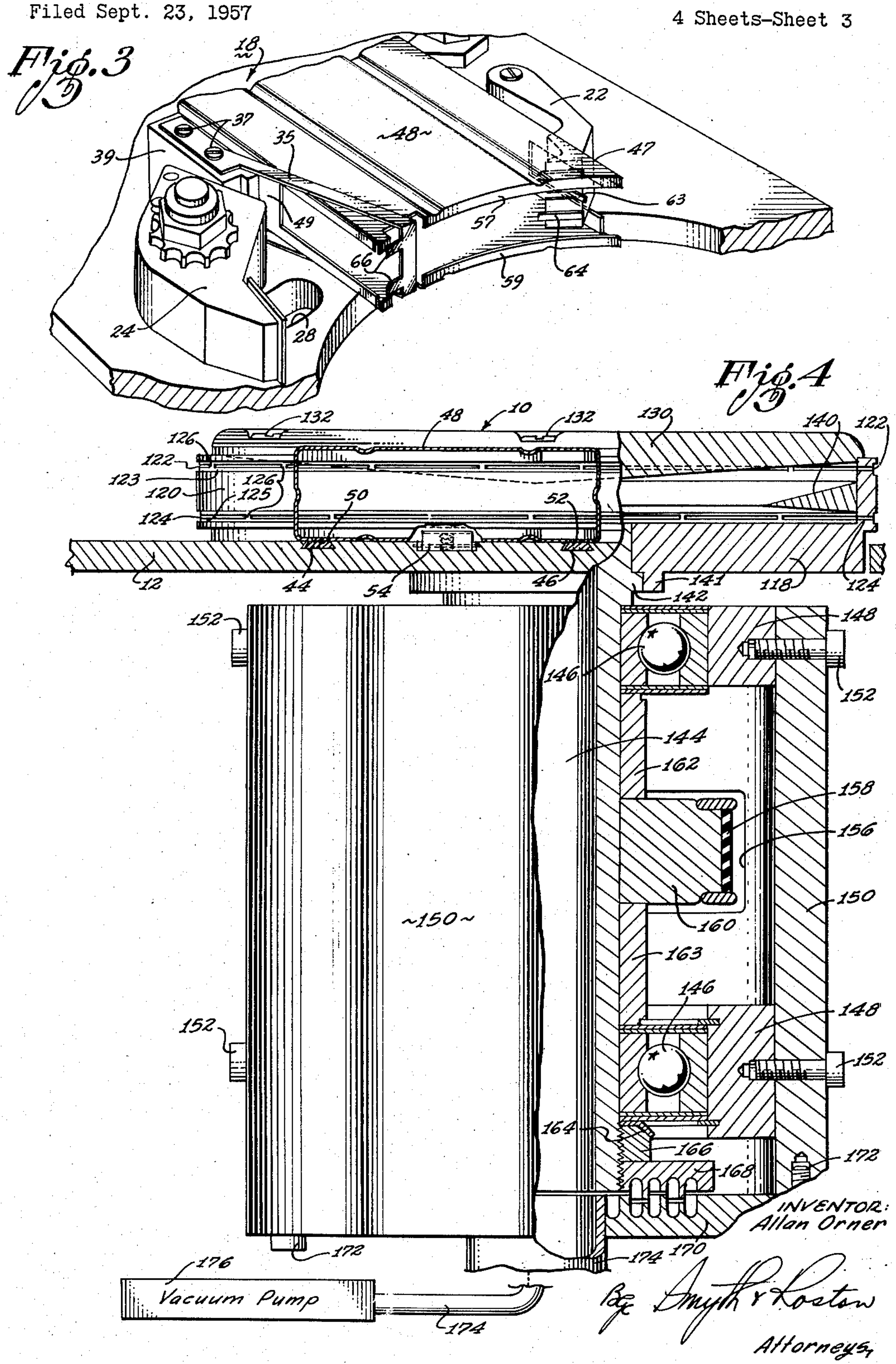
Figure 3 is a perspective view similar to the view of Figure 2, but on a reduced scale, Figure 2 showing the station in one operating condition and Figure 3 showing the station in a second operating condition.
Figure 4 is a side elevational view, partly in section, of the transporting drum of Figure 1 and particularly illustrates the constructional details of the drum.

The station 18 is shown as including a pair of parallel guide grooves 44 and 46 formed in its base. These guide grooves extend radially outwardly from the periphery of the drum 10 and they are spaced from each other. As shown in Figure 4, these guide grooves may have an undercut configuration. A magazine 48 is adapted to be positioned in the station 18, and as shown in Figure 4, the magazine has a pair of depending portions 50 and 52 which are adapted to extend into respective ones of the guide grooves 44 and 46. These depending portions may be flared outwardly to interlock with the sides of the grooves and hold the magazine down on the table top. The arrangement is such that the magazine 48 may be moved into position along the guide grooves with its depending portions 50 and 52 extending into the grooves. The magazine is moved forwardly in the grooves until its open front end engages the periphery of the drum 10. When this occurs, a spring-loaded latch 54 in the floor of the station snaps up against the closed rear end of the magazine to hold the magazine in position.

The magazine has an internal coil spring 56. The coil spring 56 engages a pusher member 58 which, in turn, moves against the stack of cards supported in the magazine and biases the stack toward the front of the magazine.

Figures 2, 5:
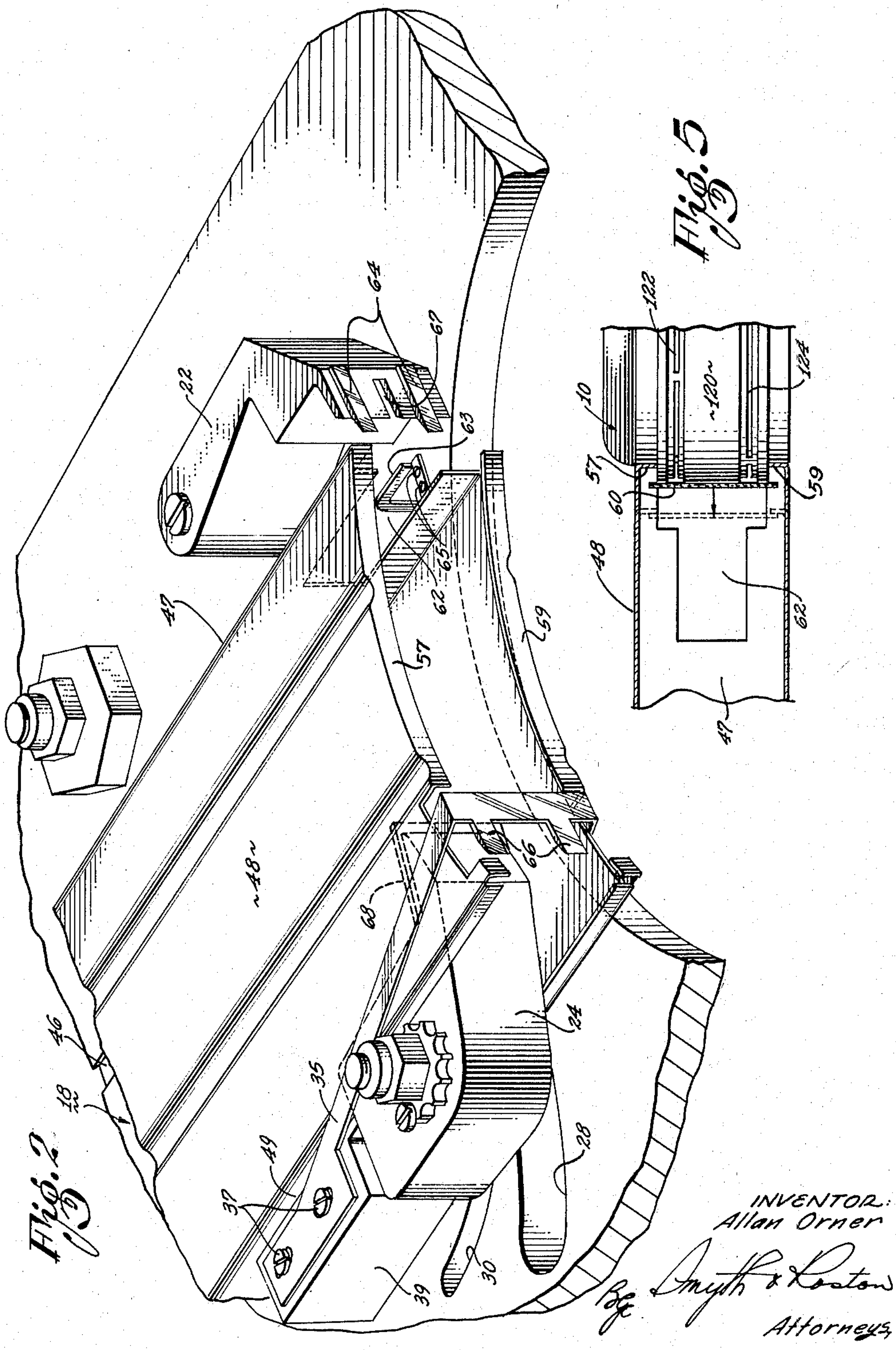
Figure 2 is a fragmentary perspective view of one of the stations of the apparatus shown in Figure 1, the latter view illustrating on a somewhat enlarged scale the forward portion of the magazine and the manner in which it permits the various components of the station to operate without interference.
Figure 5 is a fragmentary elevational view of the drum and of the magazine and particularly illustrates the manner in which a pair of lips formed adjacent the open end of the magazine function to embrace cards transported by the drum.

As best shown in Figure 2, the top of the magazine 48 has a downwardly depending lip portion 57 adjacent the open end of the magazine, and the bottom of the magazine has an upwardly extending lip portion 59 adjacent the open end. These lip portions serve to retain the cards in the magazine. It should be pointed out that the width and height of the magazine correspond essentially to the width and height of the cards supported in it. The front edges of the sides of the magazine 48 are displaced back from the periphery of the drum 10 a sufficient distance to define slots with the peripheral surface of the drum. These slots permit the drum to transport cards in and out of the magazine 48.

As shown, for example, in Figure 5, cards 60 are transported on a central portion of the drum 10 which has an increased peripheral diameter with respect to the remaining portion of the drum. This central portion has a width which is less than the width of the cards so that the cards extend axially over the edges of the portion. The cards, therefore, may be embraced by the lips 57 and 59 as they are transported into the mouth of the magazine by the drum 10. This tends to facilitate the transfer of cards from the drum to the magazine.

The side 47 of the magazine 48 has an opening 62 which is adapted to receive the stack head 22. As also illustrated in Figure 2, the stack head 22 has a pair of guide fingers 64 on its lower surface. When the stack head 22 is moved to its operative position, the fingers 64 intimately engage the peripheral surface of the drum 10, and the stack head 22 fills the opening 62 in the side of the magazine, as shown in Figure 3. However, when the stack head 22 is retracted to its standby position, as illustrated in Figure 2, it is moved away from the periphery of the drum 10. A member 63 (Figure 2) is mounted on the base of the magazine 18 by means of a pair of set screws 65. The member is positioned to be adjacent the side 47 of the magazine when the magazine is in place. The leading edge of the member 63 defines a throat with the periphery of the drum 10. This throat is just wide enough to permit one card at a time to be fed out of the magazine onto the periphery of the drum 10. The stack head 22 has a slot 67 which receives the member 63 when the stack head is moved to its operative position.

The lifter assembly 35 is illustrated as being mounted by a pair of screws 37 on a pedestal 39 in Figure 2 adjacent the side 49 of the magazine 48. The lifter has a pair of guide fingers 66. These guide fingers are formed at the end of a rectangular portion of the lifter assembly which extends at an angle across the left-hand corner of the magazine 48 in Figure 2. The cards transported by the drum 10 are carried through the rectangular portion of the lifter, and the fingers 66 intimately engage the periphery of the drum so that the cards transported by the drum ride up over these fingers. The fingers are bulged outwardly from the drum so that when the stack head 22 is in its operative position to arrest the cards transported by the drum, the cards so arrested have their trailing edges projecting over the fingers, and these trailing edges are displaced away from the periphery of the drum 10. This permits the next succeeding card transported by the periphery of the drum 10 to pass under the preceding card and up and over the fingers 66 until it too is arrested by the stack head 22. In this manner, and when the stack head 22 is in its operative position, the cards transported by the periphery of the drum 10 are arrested and deposited in their proper sequence into the magazine 48.

The side 49 of the magazine 48 to the left in Figure 2 has an opening in it to receive the feed head 24. This permits the feed head to move freely between its standby position and its operative position. When the feed head 24 is moved into the magazine to its operative position, its coacting surface 68 engages the trailing portion of the leading card in the magazine. The controllable vacuum pressure introduced to this head is exerted at this surface.

As stated previously, the pusher member 58 of Figure 1 biases the stack of cards in the magazine 48 toward the open front end of the stack and against the lips 57 and 59. When the magazine is pushed into position in the station 18 and the feed head 24 is controlled to its operative position (with the stack head 22 being simultaneously retracted to its standby position) as shown in Figure 2, the cards are so controlled that the front card has its trailing portion engaging the surface 68 of the feed head 24. At the same time, the leading portion of the front card is disposed against the peripheral surface of the drum 10. The drum 10, therefore, tends to draw the card out of the magazine and the feed head 24 tends to retain the card in the magazine. The vacuum pressure at the surface 68 is made sufficient to prevail so that the cards stay in the magazine 48 so long as this vacuum pressure remains. However, whenever the vacuum pressure at the surface 68 is interrupted, the drum 10 is able to draw the cards one after the other through the throat formed by the leading edge of the member 63 and the periphery of the drum.

When the magazine 48 is in the storage area, the stack of cards contained in it is biased toward the open front of the magazine and against the lips 57 and 59 by the spring-loaded pusher member 58. When it is desired to process the cards in the magazine, the station 18 may be conditioned to its feeding mode as shown in Figure 2, for example. Then, the magazine 48 is simply moved forward in the grooves 44 and 46 until its forward end is contiguous with the periphery of the drum 10. This movement is continued until the latch 54 snaps into place and holds the magazine in position.

The leading card in the magazine is now engaged by the surface 68 of the feed head 24, and the cards are ready to be fed from the magazine to the periphery of the drum 10. The cards may then be controllably fed to the drum by an appropriate control of the vacuum pressure at the surface 68 of the feed head 24.

After the processing is completed, the station 18 may be conditioned to its stacking mode, as shown in Figure 3. Then, cards transported by the drum are arrested by the stack head 22 and are deposited one after the other into the magazine 48. When the operation is complete, the latch 54 is released, and the magazine may be retracted and removed. The lips 56 and 58 engage the last card on the drum and draw it away from the drum into the magazine as the magazine is withdrawn.

As shown in Figure 1, the station 20 may incorporate a similar magazine 70, and the latter magazine may be held in place by a spring-loaded latch 72.

As mentioned above, the constructional details of the vacuum transporting drum 10 are shown in Figure 4. The illustrated drum is similar to the one disclosed and claimed in copending application Ser. No. 600,975 which was filed July 30, 1956, in the name of Loren R. Wilson.

The lower section of the drum includes a disk-like bottom portion 118 and an annular integral side portion 120. A pair of axially spaced peripheral orifices 122 and 124 extend through the side portion 120. Each of the peripheral orifices is discontinuous in that it is interrupted at selected intervals about its periphery by a plurality of posts 126 which are integral with the side portion 120. As illustrated in Figure 4, the side portion 120 has an increased outer diameter with respect to the top and bottom of the drum, for the reasons described above. As noted above, the axial length of this side portion 120 is made less than the width of the transported cards 60 so that the cards may be carried on that portion with their top and bottom edges extending beyond its edges.

The upper section of the drum 10 is in the form of a disk-like member 130 which engages the annular side member 120 of the lower section. The upper section 130 forms an enclosure with the lower section of the drum, with the upper section being parallel to the disk-shaped bottom portion 118 of the lower section. The upper section 130 is held in place by a plurality of screws 132. As shown in Figure 4, the annular side portion 120 extends radially outwardly from the upper section 130 for the reasons described above.

A deflector ring 140 is supported within the interior of the drum 10 in press-fit with the inner surface of the annular side portion 120. This deflector ring is tapered toward the center of the drum, and it serves to prevent turbulence and to provide a streamlined path for air that is drawn in through the orifices 122 and 124 to create a vacuum pressure at the outer peripheral surface of the annular portion 120. Moreover, the under surface of the upper section 130 is bulged to have a convex shape. This also aids in providing a smooth path for the air drawn in through the orifices 122 and 124 so as to prevent turbulence.

It will be noted that the annular side portion 120 of the drum has a pair of annular grooves 123 and 125 extending around its periphery adjacent respective ones of the orifices or slots 122 and 124. The annular grooves are adapted to receive the fingers 64 of the stack head 22 and the fingers 66 of the lifter assembly 35. This enables these fingers intimately to engage the periphery of the drum and to strip any cards transported to them by the drum.

The disk-like bottom portion 118 of the lower section of the drum 10 contains a central opening surrounded by an annular collar 141. The collar 141 surrounds a collar 142 provided at one end of a hollow shaft 144. The drum 10 is supported on a shoulder formed by the collar 142, and the end of the shaft 144 extends into the central opening of the portion 118 in friction-fit with that portion. Therefore, rotation of the hollow shaft 144 causes the drum 10 to rotate. Also, the interior of the hollow shaft 144 communicates with the interior of the drum.

Bearings 146 are provided at the opposite ends of the shaft 144. The inner races of the bearings 146 are mounted on the shaft 144, and the outer races of the bearings are disposed against bushings 148. These bushings are secured to a housing 150 by a plurality of studs 152. An arcuate opening 156 is provided in the housing 150 between the bearings 146. This opening enables a drive belt 158 to extend into the housing and around a pulley 160.

The pulley 160 is keyed to the shaft 144 between the bearings 146. The pulley is held against axial movement on the shaft by a pair of sleeves 162 and 163. These sleeves are disposed on the shaft 144 between the pulley 160 and respective ones of the bearings 146. In this manner, the shaft 144, and, therefore, the drum 10 can be rotated by a suitable motor (not shown) which is coupled to the drive belt 158.

The bearings 146 and the sleeves 162 are held on the shaft 144 by a nut 166, and a lock washer 164 is interposed between the nut and the lowermost bearing. A sealing disk 168 is also threaded on the bottom of the shaft 144. The sealing disk operates in conjunction with a bottom plate 170 to resist the movement of air between the interior of the housing 150 and the interior of the hollow shaft 144 when a pressure differential exists between these elements.

The bottom plate 170 is secured to the housing 150 by a plurality of studs 172, and the bottom plate has a central circular opening. A hollow conduit 174 extends into the opening in the bottom plate in press-fit with the plate. The conduit 174 is axially aligned with the hollow shaft 144 so that air may be exhausted from the hollow interiors of the shaft and the conduit by a vacuum pump 176. The vacuum pump may be of any suitable known construction and, for that reason, it is shown merely in block form.

The vacuum pump 176 draws air in through the orifices 122 and 124, through the interior of the drum 10, down the shaft 144 and through the conduit 174. This creates a vacuum pressure at the outer peripheral surface of the annular portion 120 of the lower section of the drum 10. The deflector ring 140 and the convex under side of the disk-like upper section 130 assure that the air will flow smoothly and with a minimum of turbulence. This enables a high and adequate vacuum pressure to be provided around the outer surface of the annular side portion 120 to retain the transported cards firmly on that surface.

The invention provides, therefore, improved and convenient apparatus which enables the information cards to be conveniently stored in a storage area. As described above, different groups of the cards are housed in individual magazines. Whenever any cards of a particular group are to be processed, it is merely necessary to insert the appropriate magazine into the input station of the apparatus.

The insertion of the magazine into the input station may be carried out in an extremely simple and rapid manner merely by sliding it along grooves at the station until it is snapped into place.

When the magazine is in place, the feeding and stacking components of the station are able to operate on an unimpeded basis such that cards may be fed to and from the station without interference by the magazine.

When the processing of the cards has been completed and the cards have been returned to the magazine, the magazine may be simply and easily unlatched and removed from the station. The construction of the magazine is such that the cards are biased toward the open front end of the magazine but that end is constructed so that the cards do not fall out of the open end. The tension of the resilient pusher member in each magazine may be made sufficiently strong that the cards are firmly held against the lips at the front end of the magazine. There is then no tendency for the cards to slip through the side slots between the sides and these lips as the magazine is being carried from place to place.

Figure 6:
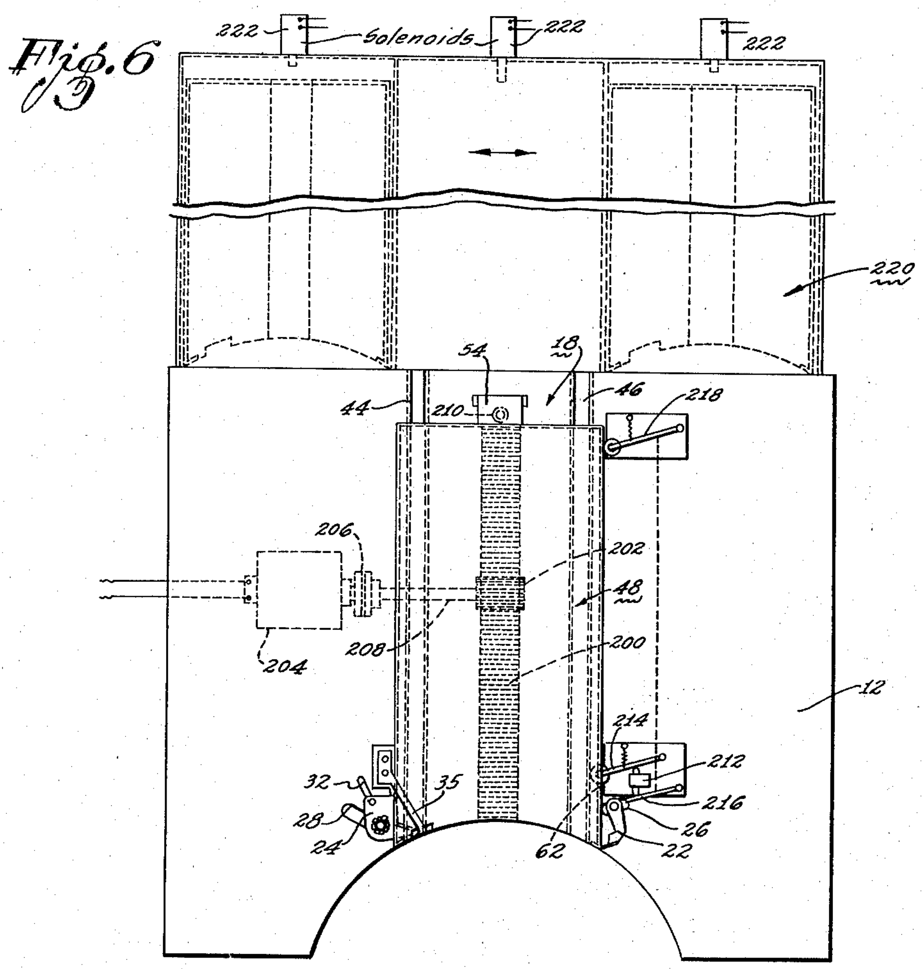
Figure 6 is a fragmentary top plan view of a second embodiment of the invention in which the magazine may be automatically ejected from an adjacent file and driven into place in the station, and in which the magazine may be automatically returned to the file at the end of the processing.

In the embodiment of Figure 6 each magazine 48 has a rack 200 formed on its bottom surface and extending from one end of the magazine to the other. This rack may conveniently be stamped in the bottom of each magazine.

A pinion 202 is rotatably mounted in the base of the station 18. This pinion is positioned to engage the rack 200 to move the magazine back and forth in the slots 44 and 46.

An electric motor 204 is mounted under the base of the station 18, and this motor is mechanically coupled to an electrically-actuated clutch 206. Both the motor and the clutch may have any appropriate known construction. A shaft 208 couples the clutch 206 to the pinion 202.

A solenoid 210 has its armature coupled to the spring-loaded latch 54. This solenoid may be energized to retract the latch and free the magazine 48 at the completion of processing. This enables the magazine to be withdrawn by the rack and pinion arrangement 200, 202.

A first limit switch 212 is mounted on the base of the station 18. This switch has a first operating arm 214 which is normally spring biased out of engagement with the switch 212. However, when the magazine 48 is moved into place, the edge of the slot 62 in the side of the magazine moves the arm 214 into engagement with the switch 212. The switch is a double-pole double-throw snap acting type. Therefore, when the magazine 48 is moved into place, the arm 214 causes the switch to be snapped into one of its two operating conditions.

The switch 212 has a second operating arm 216 which is capable of snapping the switch to its other operating condition. This latter arm is mechanically coupled to an operating arm 218, the arm 218 being pivoted to the base of the station 18 and being spring biased against the side of the magazine 48. When the magazine is completely retracted, the arm 218 moves the arm 216 against the switch 212 to snap the switch to its other operating condition.

The magazines are stored in a file such as the file 220. This file stores the magazines in a stacked condition in individual compartments. The file may be controlled to be movable in a direction to the left and right in Figure 6, and up and down into and out of the plane of the paper. This file may be controlled in a manner similar to the file described in copending application Ser. No. 587,055 which was filed May 24, 1956, in the name of Allen P. Algier et al. The control is such that any desired magazine may be brought into alignment with the station 18.

Each compartment in the file is equipped with a solenoid 222. This solenoid, in each instance, is mounted on the rear wall of the file and when it is energized its armature moves out to eject the selected magazine into the grooves 44 and 46 of the station.

Figure 7:
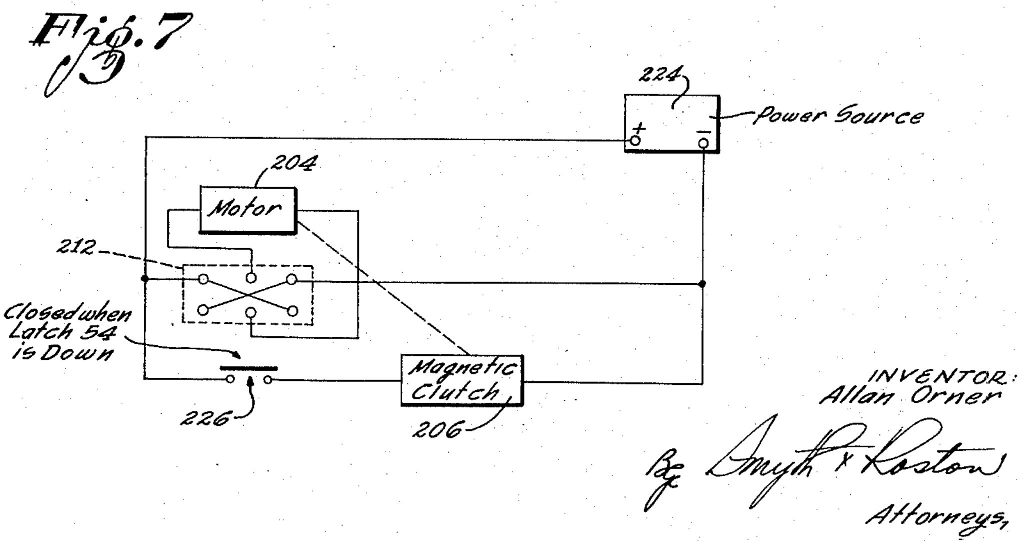
Figure 7 is a circuit diagram of a portion of a suitable control system for the equipment of Figure 6.

As shown in Figure 7, the limit switch 212 has its end terminals cross-connected to function as a reversing switch. One pair of the end terminals is connected to the positive terminal of a unidirectional power source 224, and the other pair of the end terminals is connected to the negative terminal of this source. The center terminals of the switch are connected to the motor 204.

A switch 226 is mechanically coupled to the latch 54 and this switch is closed whenever the latch is down. The switch 226 is connected between one terminal of the magnetic clutch 206 and the positive terminal of the source 224. The other terminal of the clutch is connected to the negative terminal of the power supply 224.

Now, when the file 220 is controlled by an appropriate control system associated with the data processing system to bring a selected magazine into alignment with the station 18, and, when the slenoid 222 associated with that magazine is pulsed to eject the magazine, such ejection of the desired magazine causes it to pass over the latch 54 to bring its rack 200 into engagement with the pinion 202. The depression of the latch 54 closes the switch 226 to activate the clutch 206. The motor is continually energized, and such activation of the clutch couples the motor to the pinion.

The magazine 48, therefore, moves forward into place. When it has reached its forward limiting position, the latch 54 springs up to hold the magazine in place. This also causes the switch 226 to open to de-clutch the motor.

When the magazine is so moved into place, and after the motor has been de-clutched, the arm 214 is moved against the limit switch 212 to snap it to its other position. This causes the connections to the motor 204 to be reversed, and the de-clutched motor is driven in the opposite direction.

At the completion of the processing of the cards in the selected magazine, the control system associated with the processor energizes the solenoid 210 for a moment. This causes the latch 54 to be lowered and the switch 226 to be closed. The closing of the switch 226 causes the clutch 206 to couple the reversed motor 204 to the pinion 202. This causes the pinion to rotate in the proper direction to retract the magazine. When the retraction has commenced, the magazine itself holds the latch 54 down and the switch 226 closed. There is, therefore, no need to continually energize the solenoid 210.

The pinion 202 returns the magazine 48 to the file with sufficient velocity that the momentum of the magazine reutrns it completely into the file. As this occurs the latch 54 rises breaking the connection to the magnetic clutch 206. The motor 204 is therefore, again de-clutched. Also, the arm 218 is moved under the spring bias to cause the arm 216 to snap the switch 212 to its other operating condition. This reverses the connections to the de-clutched motor 204. Therefore, the next time a magazine is ejected from the file 220 to drop the latch 54, the motor will be rotating in the proper direction to cause the pinion 202 to move that magazine forward into position.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In an apparatus for processing data on a plurality of information storage cards, the combination of: transport means for the cards, a structure defining a supporting surface adjacent said transporting means, and a magazine movable on the supporting surface and constructed to hold the information cards in a stacked condition on said supporting surface and having an end disposed in coupled relationship to said transport means in one position of the transport means for a transfer of cards between the transport means and the magazine, and means coupled to the magazine for providing a controlled movement of the magazine along the supporting surface into position for a transfer of cards between the transport means and the magazine.

2. In apparatus for processing data on a plurality of information storage cards, the combination of: transporting means for the cards, a structure defining a supporting surface adjacent said transporting means, a removable magazine for holding information storage cards in a stacked condition on said supporting surface and having an open end contiguous to said transporting means, a feed head movable to an operative position to control the transfer of cards from the magazine to the transporting means, a stack head movable to an operative position to control the transfer of cards into the magazine, said magazine having a first wall with an opening therein to receive the feed head, said magazine having a second wall with an opening therein to receive the stack head, and means spaced a selected distance from the transporting means to define a throat therewith for controlling the passage of cards from the magazine to the transporting means.

3. In apparatus for processing data on a plurality of information storage cards, the combination of: a rotatable transporting drum for the cards, a structure defining a supporting surface adjacent said drum, a movable magazine for holding information storage cards in a stacked condition on said supporting surface and having an open end contiguous to the periphery of said drum, a feed head movable to an operative position to control the transfer of cards from the magazine to the drum, a stack head movable to an operative position to control the transfer of cards from the drum into the magazine, said magazine having a first wall with an opening therein to receive the feed head, said magazine having a second wall with an opening therein to receive the stack head, and means spaced a selected distance from the periphery of said drum to permit one card at a time only to pass from the magazine to the drum.

4. In apparatus for processing data on a plurality of information storage cards, the combination of: a structure defining a table, a vacuum pressure transporting drum rotatably mounted on said table to carry the cards during its rotation, said table having guiding means formed therein extending radially outward from the periphery of said drum, a removable magazine for holding information storage cards in a stacked condition and supported in said guiding means on said table and having an open end contiguous to the periphery of said drum, a feed head movable to an operative position to control the transfer of cards from the magazine to the drum, a stack head movable to an operative position to control the transfer of cards from the drum into the magazine, said magazine having a first wall with an opening therein to receive the feed head and said magazine having a second wall with an opening therein to receive the stack head, and means spaced a selected distance from the periphery of said drum to permit one card at a time only to pass from the magazine to the drum.

5. In apparatus for processing data on a plurality of information storage cards, the combination of: a supporting structure, means including a transport means rotatably mounted on said supporting structure to carry the cards, the periphery of said transport means having an annular central portion of increased diameter with respect to the rim portions thereof and the cards being transported on said central portion and having an axial width with respect thereto so as to project axially over the edges thereof, a removable magazine for holding information cards in a stacked condition on said supporting structure and having an open end contiguous to the periphery of said transport means, and said magazine further having a lip portion contiguous to said open end thereof and extending over the central portion of the peripheral surface of said transport means to embrace the axially projecting portions of the cards transported on such central portion for facilitating the transfer of cards from the transport means to the magazine.

6. In apparatus for processing data on a plurality of information storage cards, the combination of: a supporting structure, transport means rotatably mounted on said supporting structures to carry the cards, the supporting structure having a guide-groove therein and extending radially outwardly from the periphery of said transport means, a removable magazine for holding information cards in a stacked condition on said supporting structure, said magazine having a guiding portion extending into said groove and having an open end, and spring-loaded latch means on said supporting structure for holding said magazine in position with the open end thereof in contiguous relationship to the periphery of said transport means.

7. The combination set forth in claim 6 in which said magazine includes resilient means for biasing stacked cards therein towards said open end thereof.

8. In apparatus for processing data on a plurality of information storage cards, the combination of: a supporting structure having guides in the structure, transport means for the cards, a removable magazine constructed and disposed relative to the supporting structure for holding information cards in a stacked condition on said supporting structure and constructed for movement along the guides in the supporting structure into position for a transfer of cards between the magazine and the transport means and having an open end contiguous to the periphery of said transport means, said magazine having a top with a downwardly depending lip adjacent said open end and having a bottom with an upwardly extending lip adjacent said open end, said lips serving to retain cards in said magazine, said magazine having a pair of spaced sides each defining a slot with the periphery of said drum to obtain the movement of cards by said transport means into and out of said magazine, and means for limiting the movement of the magazine along the guides in the supporting structure for a positioning of the magazine relative to the transport means to obtain an individual and sequential transfer of cards between the magazine and the transport means.

9. In apparatus for processing data on a plurality of information storage cards, the combination of: a supporting structure, means including a transporting drum rotatably mounted on said table top to carry the cards, the periphery of said drum having an annular central portion of increased external diameter with respect to the rim portions thereof and the cards being transported on such central portion and having a width relative thereto to project axially over the edges thereof, a removable magazine for holding information cards in a stacked condition on said supporting structure and having an open end contiguous to the periphery of said drum, said magazine further having at least one lip portion contiguous to said open end thereof and extending over the central portion of the peripheral surface of said drum and adapted to embrace the axially projecting portions of the cards transported on such central portion, a feed head movable to an operative position to control the transfer of cards from the magazine to the drum, a stack head movable to an operative position to control the transfer of cards from the drum into the magazine, said magazine having a first wall with an opening therein to receive the feed head, and said magazine having a second wall with an opening therein to receive the stack head, and means spaced a selected distance from the periphery of said drum to provide for the passage of only one card at a time from the magazine to the drum.

10. A magazine for use in conjunction with a transporting drum, a movable feed head and a movable stack head, in apparatus for processing data on a plurality of information storage cards, said magazine including: a pair of sides, a top and a bottom for housing information cards in a stacked condition, said top having a downwardly depending lip portion and said bottom having an upwardly extending lip portion both contiguous to an open end of said magazine to retain cards in said magazine, said sides of said magazine being disposed to define slots with the periphery of the transporting drum for the movement of cards into and out of said magazine by said transport means when the magazine is positioned with said open end contiguous to such periphery, one of said sides having an opening to receive the feed head when the magazine is positioned in contiguous relationship to the drum and the other of said sides having an opening to receive the stack head when the magazine is positioned in contiguous relationship to the drum.

11. In apparatus for processing data on a plurality of information storage cards, the combination of: transporting means for the cards, a structure defining a supporting surface adjacent said transporting means, a removable magazine for holding information cards in a stacked condition on said supporting surface and having an open end contiguous to said transporting means, a rack formed on the bottom surface of said magazine and extending along such surface from one end of the magazine to the other, a pinion rotatably mounted on said supporting surface and adapted to engage the rack on said magazine, and control means coupled to said pinion for moving said magazine forward into position adjacent said transporting means and for subsequently retracting said magazine.

12. In apparatus for processing data on a plurality of information storage cards, the combination of: transporting means for the cards, a structure defining a supporting surface adjacent said transporting means, a removable magazine for holding information cards in a stacked condition on said supporting surface and having an open end contiguous to said transporting means, a rack formed on the bottom surface of said magazine and extending along such surface from one end of the magazine to the other, a pinion rotatably mounted on said supporting surface and adapted to engage the rack, file means for housing said magazine, means for ejecting the magazine from the file to bring the rack into operative engagement with the pinion, and control means coupled to said pinion for moving the magazine into position adjacent said transporting means and for subsequently returning the magazine to the file.

13. In apparatus for processing data on a plurality of information storage cards, the combination of: transport means for the cards, a magazine constructed to hold a plurality of cards and movable relative to the transport means in a direction toward or away from the transport means, motor means coupled to the magazine for moving the magazine in the direction toward or away from the magazine, means coupled to the magazine for limiting the movement of the magazine away from the transport means and for limting the movement of the magazine toward the transport means for a positioning of the magazine relative to the transport means to obtain a transfer of cards between the transport means and the magazine, and means coupled to the magazine for preparing the motor for operation in a direction to move the magazine away from the transport means upon a positioning of the magazine at the limit near the transport means and for preparing the motor for operation in a direction to move the magazine toward the transport means upon a positioning of the cards at the limit away from the transport means.

14. In apparatus for processing data on a plurality of information storage cards, the combination of: transport means for the cards, a magazine constructed to hold a plurality of cards and movable relative to the transport means in a direction toward or away from the transport means, motor means coupled to the magazine for moving the magazine in the direction toward or away from the magazine, first means responsive to the movement of the magazine in a direction toward the transport means and operative upon a particular spacing between the magazine and the transport means for preparing the motor for driving the magazine in a direction away from the transport means, and second means responsive to the movement of the magazine in a direction away from the transport means and operative upon a particular spacing between the magazine and the transport means for preparing the motor means for driving the magazine in a direction toward the transport means.

15. In apparatus for processing data on a plurality of information storage cards, the combination of: transport means for the cards, a magazine constructed to hold a plurality of cards and movable relative to the transport means, and means disposed in co-operative relationship with the magazine for limiting the movement of the magazine toward the transport means and for positioning the magazine relative to the transport means to obtain a transfer of cards between the transport means and the magazine, the magazine being constructed at its end closest to the transport means to facilitate a sequential transfer of cards between the transport means and the magazine.

16. In apparatus for processing data on a plurality of information storage cards, the combination of: transport means for the cards, a plurality of magazines each constructed to hold a plurality of cards, file means for holding the plurality of magazines, means responsive to the selection of a particular one of the magazines from the plurality for obtaining a movement of the particular magazine toward the transport means, means responsive to the movement of the particular magazine for limiting the movement of the magazine to a position for obtaining a transfer of cards between the transport means and the magazine, and means operative upon the cards in the limited position of the magazine for obtaining a controlled transfer of cards between the magazine and the transport means.

17. In apparatus for processing data on a plurality of information storage cards, the combination of: transport means for the cards, a magazine constructed to hold a plurality of cards and movable relative to the transport means in a direction toward or away from the transport means, mechanical means coupled to the magazine to limit the movement of the magazine toward the transport means for a particular positioning of the magazine to obtain a transfer of cards between the transport means and the magazine, a feedhead movable to first and second positions and disposed relative to the magazine in the first position of the feedhead and in the particular positioning of the magazine for obtaining a transfer of cards from the magazine to the transport means and disposed in the second position out of coupled relationship to the magazine for inhibiting the transfer of cards from the magazine to the transport means, and a stackhead movable to first and second positions and disposed relative to the magazine in the first position of the stackhead and in the particular positioning of the magazine for obtaining a transfer of cards from the transport means to the magazine and disposed in the second position out of coupled relationship to the transport means for inhibiting the transfer of cards from the transport means to the magazine.

18. In apparatus for processing data on a plurality of information storage cards, the combination of: transport means for the cards, a plurality of magazines each constructed to hold a plurality of cards and each movable toward the transport means for a positioning relative to the transport means to provide a transfer of cards between the transport means and the magazine, means operative upon a selection of a particular one of the magazines in the plurality of initiate a movement of the particular magazine toward the transport means, means operative upon the initiation in the movement of the particular magazine toward the transport means for driving the magazine toward the transport means, and means disposed in coupled relationship to the magazine upon an initiation in the movement of the magazine for limiting the movement of the magazine toward the transport means for a positioning of the magazine relative to the transport means to provide an individual transfer of cards between the magazine and the transport means.

19. In apparatus for processing data on a plurality of information storage cards, the combination of: means including movable transport means for obtaining a movement of the cards with the transport means, a supporting table, a plurality of magazines movable relative to the transport means and each constructed to hold the cards in stacked relationship for an individual and sequential transfer of cards into and out of the magazine, each of the magazines being constructed to provide for a movement of the magazines along the supporting table in a direction toward or away from the transport means, means including a motor operative upon a selection of a particular one of the magazines to obtain a movement of the particular magazine toward the transport means, latching means coupled to the magazine upon a movement of the magazine toward the transport means for limiting the movement of the magazine toward the transport means to obtain an individual transfer of cards between the transport means and the magazine, and transfer means operative upon the cards upon the movement of the magazine to the limited position to obtain a transfer of cards between the magazine and the transport means.

20. In apparatus for processing data on a plurality of information storage cards, the combination of: means including movable transport means for obtaining a movement of the cards with the transport means, a magazine constructed to hold the cards in stacked relationship and movable relative to the transport means to position the cards for a transfer of the cards between the transport means and the magazine, means coupled to the magazine for obtaining a movement of the magazine into position for a transfer of cards between the transport means and the magazine, means coupled to the magazine for limiting the movement of the magazine to obtain a proper transfer of cards between the magazine and the transport means, first means disposed in co-operative relationship with the magazine in the limited position of the magazine for obtaining a controlled transfer of cards from the transport means to the magazine, and second means disposed in co-operative relationship with the magazine in the limited position of the magazine for obtaining a controlled transfer of cards from the magazine to the transport means.

21. In apparatus for processing data on a plurality of information storage cards, the combination of: means including movable transport means for providing a movement of the cards with the transport means, a support table, a magazine constructed relative to the support table to provide a movement of the magazine along the table and constructed to hold the cards in stacked relationship for an individual transfer of cards into and out of the magazine, means disposed on the table and coupled to the magazine for limiting the movement of the magazine along the table toward the transport means to obtain a positioning of the magazine for a transfer of cards between the magazine and the transport means, means disposed in co-operative relationship with the magazine in the limited position of the magazine and operative upon the cards at particular times to provide a controlled transfer of cards from the magazine to the transport means, and means disposed in co-operative relationship with the magazine in the limited position of the magazine and operative upon the cards at particular times to provide a controlled transfer of cards from the magazine to the transport means.

22. In apparatus for processing data on a plurality of information storage cards, the combination of: transport means movable in closed loops, means including the transport means for holding cards in fixed positioning on the transport means for movement with the transport means, a magazine constructed to hold the cards in stacked relationship for an individual transfer of cards into and out of the magazine and provided with guides along the length of the magazine, a support table constructed for a movement of the magazine along the guides, the support table being positioned relative to the transport means to provide for a movement of the magazine along the guides into position relative to the transport means to obtain a transfer of cards between the magazine and the transport means, latching means disposed on the support table in coupled relationship to the magazine for limiting the movement of the magazine relative to the support table to obtain a positioning of the magazine for a transfer of cards between the magazine and the support table, and transfer means operative upon the cards in the limited position of the magazine for obtaining a controlled transfer of cards between the transport means and the magazine.

23. In apparatus for processing data on a plurality of information storage cards, the combination of transport means movable in closed loops, means including the transport means for holding the cards in fixed positioning on the transport means for movement with the transport means, a magazine constructed to hold the cards in stacked relationship for an individual transfer of cards into and out of the magazine and provided with guides along the length of the magazine, a support table constructed for co-operative relationship with the guides to obtain a movement of the magazine along the table, the support table being positioned relative to the transport means to provide for a movement of the magazine into position relative to the transport means to obtain a transfer of cards between the magazine and the transport means, a motor coupled to the magazine for driving the magazine along the support table, latching means disposed on the support table in coupled relationship to the magazine for limiting the movement of the magazine along the support table into coupled relationship with the transport means or out of coupled relationship with the transport means, means coupled to the motor and operative upon a movement of the magazine to the limited position in coupled relationship to the transport means to prepare the motor for driving the magazine out of coupled relationship with the transport means and operative upon a movement of the magazine out of coupled relationship with the transport means to the limited position to prepare the motor for driving the magazine into coupled relationship with the transport means, and transfer means operative upon the cards in the limited position of the magazine in coupled relationship to the transport means to obtain a controlled transfer of cards between the transport means and the magazine.

References Cited in the file of this patent

UNITED STATES PATENTS

| | | |
|---|---|---|
| 2,125,199 | Rheutan | July 26, 1938 |
| 2,241,268 | Nelson | May 6, 1941 |
| 2,752,154 | Nelson | June 26, 1956 |